Figure 1:
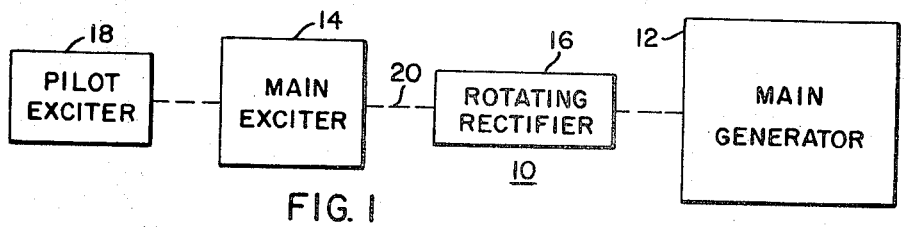

United States Patent

[11] 3,549,919

| [72] | Inventors | Andrew J. Spisak<br>Pittsburgh;<br>Sigrud R. Petersen, Irwin, Pa. |
|---|---|---|
| [21] | Appl. No. | 720,665 |
| [22] | Filed | Apr. 11, 1968 |
| [45] | Patented | Dec. 22, 1970 |
| [73] | Assignee | Westinghouse Electric Corporation<br>Pittsburgh, Pa.<br>a corporation of Pennsylvania |

[54] MAGNETICALLY AND THERMALLY BALANCED WINDINGS FOR ALTERNATING CURRENT EXCITERS
3 Claims, 3 Drawing Figs.

| [52] | U.S. Cl. | 310/68, 310/184; 318/148; 321/8, 321/27 |
|---|---|---|
| [51] | Int. Cl. | H02k 11/00 |
| [50] | Field of Search | 310/68, 66, 180, 184; 321/26, 8, 29; 322/61, 59; 318/148 |

[56] References Cited

UNITED STATES PATENTS

| 3,396,324 | 8/1968 | Karlsson et al. | 310/68X |
|---|---|---|---|
| 3,340,413 | 9/1967 | Drabik | 310/68 |
| 2,832,907 | 4/1958 | McConnell | 310/68 |
| 3,354,330 | 11/1967 | Storsand | 310/68 |
| 3,371,235 | 2/1968 | Hoover | 310/68 |
| 3,412,271 | 11/1968 | Hall | 310/68 |
| 3,421,071 | 1/1969 | Cassel | 310/68 |
| 3,444,410 | 5/1969 | Crawford | 310/68 |

*Primary Examiner*—Milton O. Hirshfield
*Assistant Examiner*—Mark O. Budd
*Attorneys*—A. T. Stratton and F. P. Lyle

ABSTRACT: An alternating current exciter armature for a rotating brushless exciter having serially connected coil turns spaced equally about the periphery of the core of the armature, the coil turns having terminal end portions spaced apart with the end portions of adjacent turns located adjacent to each other.

MAGNETICALLY AND THERMALLY BALANCED WINDINGS FOR ALTERNATING CURRENT EXCITERS

BACKGROUND OF THE INVENTION

The invention relates generally to rotor windings and particularly to windings used in alternating current exciter armatures for brushless exciters using rotating rectifiers or diodes which provide the fields of large alternating current generators with direct current.

As is generally well known, large turbine driven generators are designed to operate continuously for a period of years before being shut down for maintenance and repair. The driving turbines require considerable time to shut completely down and to start up since the turbines must be allowed to cool and reheat slowly in order to protect turbine components and maintain proper clearances. Thus, the down time for turbine generators is usually several weeks while the turbine and the generator and auxiliary equipment are thoroughly examined and tested. This, in turn, requires that the down time for the turbine generators be scheduled for seasons of low peak load so that the other machines operating to supply power demand will not be overloaded.

In recent years, large generator installations have included brushless exciters in which a pilot exciter and a regulator provide controlled field energization for a main exciter. A rotating armature on the main exciter produces an alternating voltage which is applied to rectifiers in a rotating rectifier assembly physically disposed with the main exciter armature on a common shaft. The alternating voltage is rectified in the rotating assembly and applied to the main generator field winding which is also disposed on the common shaft, thereby achieving brushless delivery of generator excitation power.

With the use of rotating rectifiers, efficiency and reliability are achieved through the elimination of maintenance and replacement problems normally associated with brushes, commutators and collector rings.

The rotating rectifier assembly usually comprises a plurality of semiconducting diodes mounted on one or more shaft supported component or diode wheels and electrically interconnected in a suitable excitation circuit between the main exciter and the field winding of the main generator. The circuit includes the armature winding of the main exciter, said winding usually comprising three-phase windings connected to a Y configuration with each phase winding in turn comprising a plurality of coil branches connected in parallel between a neutral point and respective diodes mounted on the component wheel. Each parallel branch usually comprises three serially connected, diamond-shaped coil turns disposed in adjacent slots provided in the armature core.

Since excitation power is necessary for turbine generator operation, brushless exciters must also be capable of operating for long periods of time (i.e. years) without costly shutdowns for maintenance and repair. For this reason brushless exciters are designed to operate with a prescribed percentage of the diodes inoperative in the event of diode failure, thereby allowing continued and reliable operation of the exciter and system without necessitating a costly shutdown of the system.

When a diode fails in the open mode, however, it renders its associated branch coil inactive. With a branch coil inactive in groups of active current conducting parallel connected coils, the distribution of temperature and magnetic field about the periphery of the rotating armature core becomes uneven. This thermal and magnetic unbalance additively produces an unbalanced core resulting in mechanical vibrations which could require a costly shutdown of the turbine generator.

To correct this problem, prior art brushless exciters used paralleling rings which physically and electrically connected a group of parallel connected armature coil branches together. In this manner, an open diode did not render its associated coil inactive since the paralleling rings divided current among the parallel branches in the group. Paralleling rings, however, have more recently been eliminated, and their elimination has proved advantageous. In the case where one of the diodes associated with the parallel group had a lower forward resistance than the others, the one diode would draw current away from the others resulting in an uneven current distribution among the diodes of the group unless means were provided for forcing equal current distribution. Without the paralleling rings, such a diode draws only that current flowing in its associated circuit.

However, without the paralleling rings, the problem of magnetic and thermal unbalance returns with the event of a diode failure in the rotating assembly. Thus, the present state of the art requires a means for balancing the main exciter armature without the use of paralleling rings.

BRIEF SUMMARY OF THE INVENTION

The problem of magnetic and thermal unbalance with an inactive coil can be solved by equally spacing each of the serially connected coil turns in each of the coil branches about the periphery of the armature core. However, with conventional lap or diamond-shaped alternating current windings, costly and space-consuming connecting conductors would be required to connect the coils together. The present disclosure overcomes this problem by using a coil turn having spaced terminal end portions which permit serially connected coil turns to be equally spaced about the periphery of the armature core (and thus balanced) without the use of costly, space-taking connecting conductors, the spaced terminal ends of adjacent coil turns being located mutually adjacent each other. When a diode connected to such a branch opens, all the coil turns are simultaneously inactivated (being connected in series) in equally spaced and thus balanced positions around the armature. Thus, the magnetic and thermal unbalance attendant with an inactive conventional alternating coil arrangement is eliminated. Further, the spaced terminal coils require no more slot space in the armature core than the conventional coils.

THE DRAWINGS

Figure 2:
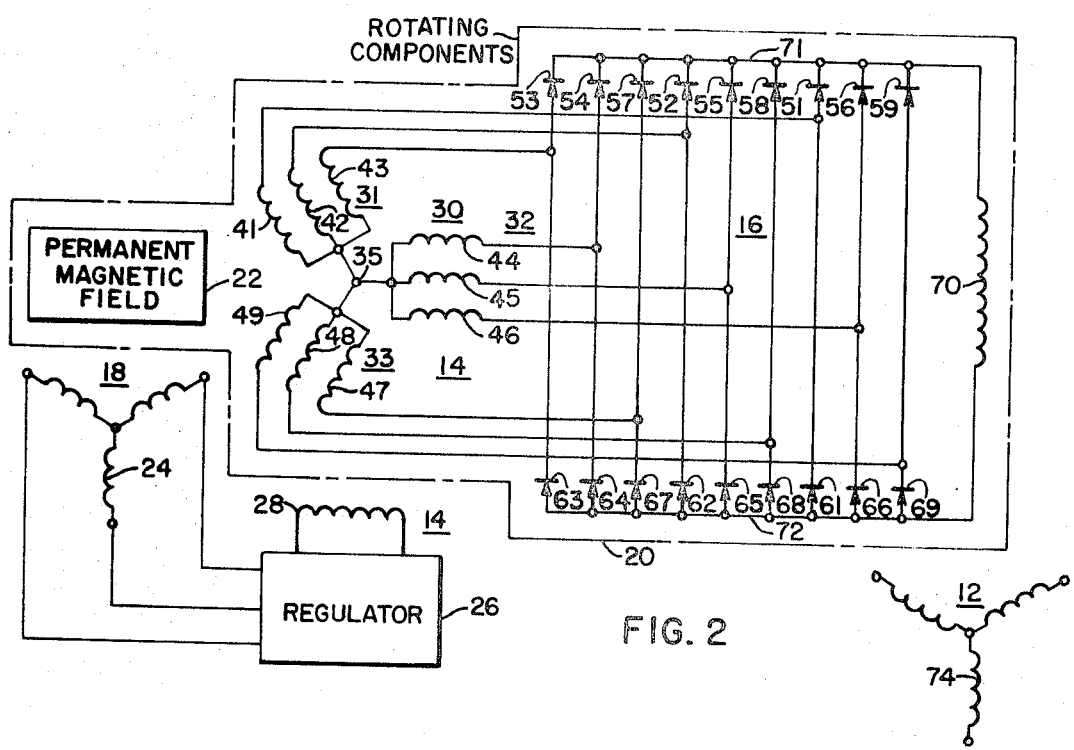
Figure 3:
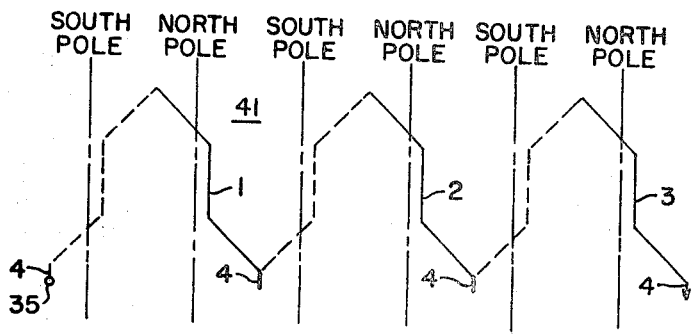

The invention, with the objects and advantages thereof, will be more apparent upon consideration of the following detailed description read in connection with the accompanying drawing in which:

FIGS. 1 and 2 show respectively mechanical and electrical schematic diagrams of a brushless synchronous generating system using a rotating rectifier exciter and a main exciter armature; and FIG. 3 is a schematic representation of a spaced terminal coil turn used in the main exciter armature shown schematically in FIGS. 1 and 2 in accordance with the invention.

PREFERRED EMBODIMENT

Specifically, FIG. 1 shows schematically an alternating current generating system 10 in which the field of a main generator 12, a turbine generator, for example, is energized by a main exciter 14 through a rotating rectifier assembly 16.

The main exciter 14 receives its field energization from a pilot exciter 18. Preferably, a mechanically common shaft 20 is provided for the system 10, which, when rotated by a suitable source of mechanical power, a steam turbine for example, is electrically self-started and self-sustained for power generation by means of the pilot and main exciters 18 and 14.

In the schematic circuit of FIG. 2, the shaft 20 is shown in dot-dash outline so as to clearly indicate the electrical and magnetic components which undergo rotation. One of these components may include a permanent magnet field member 22 electromagnetically related to a stationary armature 24 of the pilot exciter 18. In this manner a pilot voltage (usually AC) is applied to a regulator 26 when the shaft 20 is rotated.

The regulator 26 is suitably organized to control a direct current voltage applied to a stationary field winding 28 of the main exciter 14. This control is based upon main generator voltage and other information feedback to the regulator.

Thus, the main exciter 14 includes the stationary field winding 28 and a rotating armature 30 electromagnetically coupled thereto. The armature 30 is shown comprising three-phase windings, 31, 32 and 33 connected in a Y configuration though the invention is not limited thereto. As shown, when the shaft 20 is rotated and the stationary field winding 28 is energized, three-phase alternating current is generated in the phase windings.

In FIG. 2, each of the phase windings 31, 32 and 33 is comprised of a group of three separate branch coils, namely, coils 41 to 43, 44 to 46 and 47 to 49 respectively, the coils in each group being connected in parallel between a neutral point 35 and respective forward and reverse diodes 53 to 59 and 63 and 69, respectively, the diodes being mounted on a component wheel (not shown) of the rotating assembly 16. The number of windings or coils (nine) and the number of diodes (eighteen) are given only for purposes of illustration, the number employed in any given machine depending upon the design parameters of the system 10 including the generator 12.

The alternating current generated in the branch coils 41 to 49 is transmitted to the respective forward diodes 51 to 59 where it is rectified and applied, via a common bus 71, to a field winding 70 on the rotor (not shown) of the main generator 12. The rectified (DC) voltage is returned via a common bus 72 through the respective reverse diodes 61 to 69. Three-phase power is thereby generated in a stationary armature 74 electromagnetically associated with the field winding 70 in the main generator 1.

As evident from the circuit diagram of FIG. 2, an open diode in the rotating rectifier 16 would result in an inactive branch coil in the armature 30, the inactive coil losing its magnetic field and heat producing effect. For example, if the diode 53 should fail in an open condition, its associated coil 43 would be rendered inactive, while the two companion coils 41 and 42 would continue to function. Thus, the coil 43 would not generate a magnetic field and would not produce heat while the companion coils 41 and 42 would continue to do both due to the current flow therein.

Under such a condition, with the use of conventional AC winding arrangement, the armature 30 would become magnetically and thermally unbalanced, which, with high speed rotation of the armature could create mechanical unbalance and vibration requiring shutdown of the system 10 including the turbine or turbines (not shown) if the system is so driven.

As explained above, conventional AC windings are presently employed in main exciter armatures for brushless exciters, and the coil portions of such windings are generally grouped together in adjacent slots provided in the periphery of the rotor core of the armature so that any one winding is concentrated in one area on the core. With active and inactive windings grouped about the periphery of the core, magnetic and thermal activity becomes grouped or concentrated causing the mechanical unbalance which could require costly shutdown of the entire turbine-generator system.

In accordance with the invention, FIG. 3 shows diagrammatically a spaced terminal type winding comprising serially connected coil turns 1, 2 and 3. Each of the coil turns has terminal end portions 4 spaced apart at a distance greater than the width of the coil turns, though the invention is not limited thereto. The exact spacing of the terminal ends will depend upon the number of poles in the armature 30, the number of turns per pole and other design considerations.

Similarly, the number (three) of spaced coil turns shown in FIG. 3 is given by way of example only, the number of coil turns depending upon the number of poles and other design parameters of the armature 30 and the rotating rectifier 16.

The use of coil turns having spaced apart terminal ends permits the turns to be disposed in slots equally spaced about the core (as indicated by pole center lines) without the requirement of connecting conductors. As shown, the coil turns 1 to 3 can be simply integrally formed or expediently interconnected by joining together the adjacently disposed legs or terminal ends 4 thereof to form a branch coil, the coil 41 for example, for electrical connection between the neutral point 35 and the respective forward and reverse diodes 51 and 61 in the rectifier assembly 16.

For purposes of clarity, only one branch coil of a phase winding is shown in FIG. 3, and for the same reason only one turn per core slot is shown. The next branch coil forming a portion of a phase winding, the branch coil 42 of the phase winding 31 for example, would be disposed in the slots next to those occupied by the turns 1 to 3, and so on around the armature core. Further, depending upon the type of machine contemplated, each slot may have more than one turn per slot shown in FIG. 3.

The dashed line portion of each of the turns 1 to 3, as shown in FIG. 3, represents the side of the coil turn deep in the core slot while the solid line portion represents the side of coil turn located nearer the top of the slot.

With the use of the spaced apart terminal coil turns 1 to 3, as shown in FIG. 3, no interconnecting conductors are necessary as would be the case with conventional diamond-shaped windings. Interconnecting conductors require additional space within the armature and additional manufacture and assembly operations which result in increased costs.

Thus, the use of coil turns having spaced apart terminal ends in AC exciter armatures for brushless exciters solves a problem unique to brushless exciters, namely, an unbalanced condition with diode failure; and this is accomplished in an economical space saving manner with the use of such turns.

Though the invention has been described with a certain degree of particularity, changes may be made therein without departing from the spirit and scope thereof.

We claim:
1. In a brushless excitation system including an alternating current exciter having a rotatable armature and a semiconductor diode assembly rotatable therewith to supply direct current excitation to a rotatable field winding of a main alternating current generator, an armature winding for said exciter comprising a plurality of phase windings, each of said phase windings having a plurality of branches, the branches of each phase winding being connected together at one end and the other end of each branch being individually connected to the diode assembly, each winding branch comprising a plurality of series-connected coils, and the coils of each winding branch being spaced apart and uniformly distributed around the armature, said coils of each winding branch being placed in slots equally spaced apart around the armature.

2. An armature winding as defined in claim 1 in which each coil has terminal ends spaced apart a distance greater than the width of the coil with at least one of said terminal ends directly connected to a terminal end of another coil of the same winding branch.

3. An armature winding as defined in claim 1 in which the coils of different winding branches are in adjacent slots and the different winding branches follow each other in a predetermined order around the armature.